Figure 1:
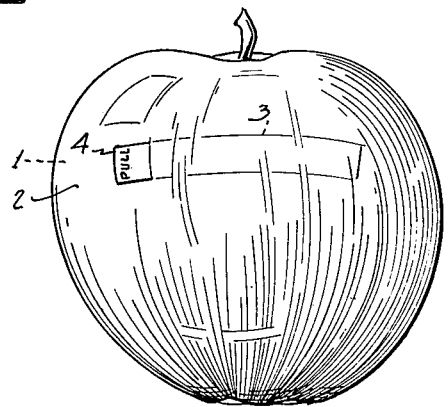

Nov. 9, 1943.  L. M. REDLINGER  2,333,887

PROTECTIVE COATINGS AND PROCESS OF MANUFACTURE THEREFOR

Filed July 26, 1941

INVENTOR
LORENZ M. REDLINGER
ATTORNEY

Patented Nov. 9, 1943

2,333,887

UNITED STATES PATENT OFFICE 2,333,887

PROTECTIVE COATING AND PROCESS OF MANUFACTURE THEREFOR

Lorenz M. Redlinger, Seattle, Wash.

Application July 26, 1941, Serial No. 404,252

9 Claims. (Cl. 99—168)

This invention relates to the art of packaging articles of commerce, and more particularly to protective coatings for articles having a volatile constituent, and to processes of applying the coatings, wherein the products to be coated are initially provided with a coating of latex or the like which forms a readily removable film-like envelope closely conforming to the surface of the article, and thereafter providing a gloss imparting agent forming a continuous outer film of extremely minute thickness, firmly adherent to the first coating, for counteracting the natural tackiness thereof and for imparting a high degree of shine or luster thereto.

This application is a continuation-in-part of an application, Serial No. 255,781, filed February 10, 1939, entitled Process of coating fruits and vegetables.

The invention is shown and described as applied to a certain specific article, namely, an apple, but it is to be understood that this is used only for purposes of illustration, as the present coating has utility for packaging not only fruits, vegetables, and other types of foodstuffs and comestibles such as meats and cheeses, but also numerous other articles of commerce which it is desired to maintain in a fresh condition. The protective coating may be applied directly upon such unitary articles of commerce as those mentioned above which, in general, have a relatively firm and smoothly continuous surface, or over another wrapping or enclosing container. Such articles as small pieces of candy, cigarettes, or material of a granular or pulverulent nature are generally provided with a paper wrapping or are packaged in a suitable enclosing container. In the case of such articles or material of commerce the wrapped package or container is provided with the protective coating to maintain the contents in marketable condition over a larger period of time than is otherwise possible. The protective coating is transparent, and has still further utility in packaging articles in general where it is desired to have the article and the label, or brand name, visible through the package, regardless of whether or not freshness is a consideration.

In the case of fruit, coatings heretofore applied thereto have been intended to serve a two-fold purpose. The first reason for such coatings is to enable the orchardist to market fruit in sound or prime condition by retarding withering of fresh fruit and keep it plump and sound from the tree to the consumer. As is well known, when desiccation takes place, the fruit tends to shrivel, and in the case of apples, tomatoes, and other thin skinned fruits, the skins are toughened. The other reason for the application of coatings to the fruit surfaces is to enhance their appearance by increasing the degree of shine or luster thereof. Heretofore this has been done by the application of waxy materials, a common expedient being to apply successive coatings of wax, the first coating consisting of a relatively soft wax such as paraffin, and the second coat of harder wax for the purpose of imparting a shine to the fruit. One method now in extensive commercial use employs a waxy composition obtainable by melting paraffin wax and carnauba wax together in the proportions of 90% paraffin and 10% carnauba wax, and rubbing it on the fruit in a heated chamber. These coatings of wax are applied uniformly over the surface of the fruit in a firmly adherent coating, the wax working its way into every surface porosity. There are, however, sound reasons why the application of wax to the surface of fruit is objectionable, it being fully appreciated, however, that these objections have been subordinated to the fact that no better process of preparing the fruit for market has heretofore been discovered. Among such reasons are the facts that the coating composition contains the soft wax in a preponderating proportion which unavoidably leaves the surface of the wax slightly tacky, so that the wax tends to collect dust and soot and the like, and readily to bear the imprint of fingers, all of which convey the impression to the prospective purchaser that the fruit surface is laden with bacteria. These objections are not raised so strongly against fruits which must be peeled before being eaten, such as oranges, grapefruit, and the like. On the other hand, the marketing of apples, pears and other thin skinned fruits which may be eaten without being pared, is becoming a serious problem because of the public's antipathy toward the idea of putting into the mouth that which has been handled or touched by others.

To keep fresh fruit in a sound and prime condition, it must be permitted to breathe or transpire. Under the influence of sunlight, carbon dioxide is absorbed from the air by the fruit. After the fruit has ripened, the process which took place in the formation of the compounds constituting the essential part of the fruit is largely reversed, and carbon dioxide is given off to the atmosphere. The carbon and the hydrogen combine with the oxygen taken from the air to form carbon dioxide and water, which are exuded from the fruit during the life processes after the fruit has ripened. It is necessary, therefore, when providing a coating for fruits and vegetables, to provide an air excluding film over the surface of the fruit, and yet provide for the exudation of carbon dioxide through the covering.

In spite of the generally accepted concept that latex produces an impermeable coating, it has been determined from experiments extending over a period of years that a coating consisting of a concentrated emulsion of latex, or latex compounds, is not so impermeable as will prevent the normal breathing or transpiration process of fruit covered therewith. That this is true is evidenced by the fact that latex covered fruit gives off an aroma of substantially the same strength as if the fruit were uncovered. On the other hand, it has been determined that if the pores of the latex covering are sealed, as with talc or wax, the transpiration of the fruit ceases, and detrimental effects result. It is believed to be well established that a covering of latex will not retard ripening. The ripening process is attended by a breathing phenomenon, this being the evolution of oxygen which is restored to the air, creating the aroma of fresh fruit. A protective coating of latex which has been dusted with talc, or waxed with material which seals the pores of the latex, effectively prevents breathing, and retards or precludes proper ripening of the fruit. It is of prime importance, therefore, that the second coating of a gloss imparting agent consist of a material which will not penetrate into and seal the minute surface porosities of the latex, and yet which will spread into intimate contact therewith and adhere firmly thereto.

What has been said above with respect to fruit applies equally to vegetables such as cucumbers, tomatoes, and the like.

In the case of certain types of articles and commodities, the nature of the surfaces may be such that the protective coating cannot be applied directly thereto. In instances such as with candy, tobacco, face powder, which are usually wrapped or provided in suitable containers, the fresh condition of the articles may be preserved by the application of the protective coating to cover the surface of the conventional package. As in the case of fruits, as discussed above, the aroma of the enclosed article or material can permeate through the protective coating so that the shopper can readily detect the fragrance of the contents of the package.

The invention, therefore, comprises new and improved protective coatings for articles of commerce, the marketable condition of which is to be maintained or enhanced, and having surfaces which lend themselves to the application of protective coatings. The invention also comprises improvements in processes for applying such protective coatings to the articles of commerce.

It is a further object of the invention to provide means for facilitating the application of the coatings to the articles, and which means may also subsequently be utilized for effecting the removal of the coatings therefrom.

It is a still further object of the invention to provide means for facilitating the removal of the protective coatings herein described from articles of commerce provided therewith, and in the provision of means for identifying such articles by their brand names.

Figure 2:
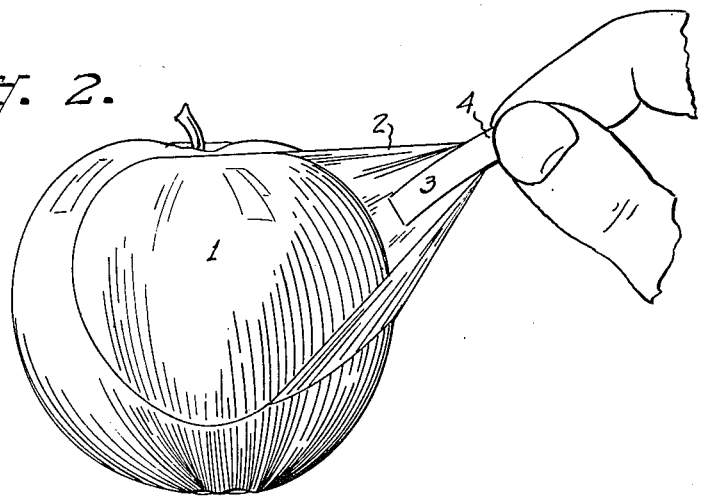
Figure 2:
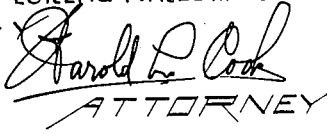

In the accompanying drawing, Figure 1 is an article of fruit which is represented as being protectively coated in accordance with the present invention; and Figure 2 illustrates the manner by which the protective coating is removed.

In general, the present invention involves treating articles with a protective covering which constitutes a combination of two coatings of quite different character successively applied, the first coating consisting of a continuous film-like envelope of latex or the like, which closely conforms to the surface of the article, but which is non-adherent thereto, the second coating superimposed upon the first being of a material which is capable of adhering firmly to the first coating, and which functions chiefly as a gloss imparting agent.

When applied to fruits and vegetables, the invention is practiced by first cleansing the surface of the article, the cleansing being accomplished preferably in the manner at present in vogue in commercial fruit packing houses, wherein the fruit is first subjected to intimate contact with an alkaline solution for removing the natural wax from the fruit, and is then thoroughly washed with a hydrochloric acid solution to remove spray residues and similar foreign matter. It is within the scope of the invention, however, to first cleanse the surface in any other suitable manner such as by washing it with soap and water, it being important from merely a marketing point of view that the surface be thoroughly cleansed of all impurities.

After cleansing, the fruit is coated by applying first a concentrated emulsion of latex, it being understood that by the use of this term reference is made to a colloidal suspension or emulsion of rubber particles in an aqueous medium. It will become apparent to those skilled in the art, however, that substances other than latex but having substantially similar characteristics may be substituted therefor. In practicing the invention, the fruit may be dipped into the latex, or similar coating material, by holding the fruit with tongs which engage the fruit at the stem and blossom ends. Because of the natural declivities at these points of the fruit, a slight excess of the coating material forms around the point of contact with the tips of the tongs which is sufficient to adhere together and close the openings when the tongs are removed. Thereupon, the fruit may be subjected to a current of air for drying the coating.

After the coating has dried, the outer surface thereof is provided with a continuous protective film composed of a gloss imparting agent by completely covering the surface thereof with an excess of a suitable material in a liquid phase, such as may be effected by dipping the fruit into and out of a bath of an aqueous emulsion or solution of a hard drying material and allowing the coated product to dry. Preferably, a current of air is passed over and around the coated product, both to dry the coatings and effectively to spread the coatings over the surface of the product during the drying process. It has been found that by simply dipping the latex covered product in, or passing the same through, a bath or mist of an emulsion or solution of, for example, a natural or synthetic resin, there is deposited thereon a relatively thin continuous film which does not require further spreading or rubbing operations to extend the film over the entire exposed surface of the fruit. The attribute of lustrousness of the second coating is positive, it being unnecessary to subject the coated products to any treatment whatever in order to impart thereto a shine or polish, the luster being inherent in the dry coating. Upon drying, it will be found that the material last applied to the product has formed a continuous outer film of extremely minute thickness, which is firmly adherent to the underneath coating, and completely removes the tackiness of the surface thereof.

In extensive research it has been found that numerous materials such as aqueous emulsions of both natural and synthetic resins, aqueous emulsions of animal, mineral and vegetable waxes, aqueous emulsions of chlorinated rubber, aqueous emulsions of cellulose esters, and others, and also various types of solutions and dispersions, possess the necessary requisites for forming a suitable final coating. Various examples of suitable coating materials in a liquid phase are set forth, although it is to be understood that this invention is not to be limited to the use of any particular one or only to those set forth. These examples are set forth merely as illustrations of various materials in a liquid phase which, when properly compounded, may be used to produce suitable films over the latex or the like covering.

Example 1.—Animal waxes such as beeswax or shellac may be used in aqueous emulsions with satisfactory results. An aqueous emulsion may be prepared of beeswax, a suitable emulsifying agent such as Trigamine Stearate which is an amine soap of stearic acid, a wetting agent such as a sulphonated ester of dicarboxylic acid, sold under the trade name, Aresol O. T. and water in the proportion of about:

|  | Per cent |
|---|---|
| Beeswax | 2.55 |
| Trigamine Stearate | .70 |
| Aresol O. T. | .25 |
| Water | 96.50 |
| Total | 100.00 |

Such an aqueous emulsion, when prepared by any convenient means whereby the ingredients are brought together and emulsified, by high speed agitation, the use of a homogenizer or colloid mill, proves satisfactory as a second coating to remove tackiness and add luster to latex or the like films. This type of emulsion is best adapted to latex coated articles subject to low relative humidities.

Example 2.—The mineral waxes such as paraffin, ceresin and montan wax, when properly emulsified in aqueous phase in the manner herein disclosed, serves as a satisfactory coating for unvulcanized latex films, whereby the tackiness of such films is entirely removed and a lustrous appearance is maintained or produced on the article so treated. An aqueous emulsion consisting of 10 parts bleached montan wax, 3 parts Trigamine Stearate, 90 parts water and 1 part of a 20% solution of a wetting agent, may be prepared by methods familiar to those skilled in the art. The resulting emulsion will contain approximately 12.5% solids. Further additions of water, with agitation, to produce an aqueous emulsion of 2.5 to 3.5% solids may be made. The lower solid content of such emulsions proves to be more satisfactory when applied as a second coating to unvulcanized latex films, especially when applied to fruit. This thin wax coating allows transpiration to proceed uninterrupted through the latex envelope.

Example 3

|  | Grams |
|---|---|
| Paraffin wax | 25 |
| Oleic acid | 13.1 |
| Triethanolamine | 6.9 |
| Water | 315.0 |

The use of paraffin waxes is restricted to the high melting point types, otherwise the resulting films are somewhat soft.

Vegetable waxes, when properly compounded with certain emulsifying agents and water, and applied to articles previously coated with latex, will, upon evaporation of the aqueous phase, deposit a thin transparent lustrous film, satisfactory in every respect.

Example 4

|  | Parts |
|---|---|
| Carnauba wax | 10 |
| Trigamine Stearate | 3 |
| Water | 260 |

The emulsifier in this case being an amine soap of stearic acid.

Example 5

|  | Per cent |
|---|---|
| Carnauba wax | 13.6 |
| Oleic acid | 2.9 |
| Morpholine | 2.5 |
| Water | 81.0 |

The carnauba wax and oleic acid are heated together to about 90° C. and the morpholine added with stirring. Water heated to about 90° C. is added slowly, with constant agitation, until such time as a change of phase from water-in-oil to oil-in-water takes place, after which the balance of the water may be added rapidly.

Example 6

|  | Per cent |
|---|---|
| Candelilla wax | 13.5 |
| Oleic acid | 2.9 |
| Morpholine | 2.6 |
| Water | 81.0 |

The same procedure is followed as in Example 5 except that minute changes have been made in the wax-morpholine ratio, to compensate for the slightly different chemical characteristics of candelilla wax.

The natural fossil resins such as manila, kauri, East India, pontianak, sandrac, dammar, clemi Congo and batik are examples of film forming materials. Manila, kauri and East India varieties have been chosen as fairly representative of this class of materials, and when emulsified as in the following examples accomplish the desired results.

Example 7

|  | Grams |
|---|---|
| Manila D. B. B. grade | 50 |
| Oleic acid | 20 |
| Morpholine | 18.3 |
| Water | 500.0 |

Example 8

|  | Grams |
|---|---|
| Kauri chips | 21.6 |
| Oleic acid | 8.7 |
| Morpholine | 7.9 |
| Water | 217.0 |

Example 9

|  | Grams |
|---|---|
| East India chips | 50 |
| Oleic acid | 20 |
| Morpholine | 18.3 |
| Water | 500.0 |

The procedure in all cases consists of adding the resin to the oleic acid and heating the mixture to the melting point of the resin. Morpholine is added, with agitation, to the mixture at about 90° C., forming the necessary soap within the mixture which acts as the emulsifying agent for the resin. Water at 90–95° C. is added carefully, with constant agitation, until such time as inversion from water-in-oil to oil-in-water takes place, noted by sudden lowering of viscosity; the remaining water may be added rapidly if desired. The resulting emulsion may be homogenized or run through a colloid mill if desired.

Example 10.—Oleoresins, which are not fossilized, being the solid portion of the exudate from several species of trees, constitute another class. Gum rosin is used as an example of this class.

| | Parts |
|---|---|
| Rosin W. G. | 70 |
| Beeswax | 2 |
| Sodium carbonate | 7 |
| Water | 221 |

This emulsion may be used as is, or may be diluted by further additions of water, depending upon the film thickness desired.

Ester gums, a product made by reacting the ordinary rosin or colophony of commerce with polyhydride alcohols under certain conditions of time and temperature, whereby the resulting product is made to more nearly approach the natural fossil resins in film forming properties, have been successfully used in aqueous emulsions to accomplish the desired results.

*Example 11*

| | Grams |
|---|---|
| Ester gum | 95 |
| Morpholine | 28.5 |
| Water | 1000.0 |

These ingredients may be emulsified in essentially the same manner as previously set forth.

*Example 12*

| | Grams |
|---|---|
| Pentaerythritol abietate | 50 |
| Oleic acid | 20 |
| Triethanolamine | 4.2 |
| Mineral spirits | 15.0 |
| Water | 500.0 |

More or less oleic acid may be used, depending on the plasticity required in the resulting film.

Chlorinated rubber, available commercially, and exhibiting excellent film forming properties, may be emulsified in the aqueous phase, and constitutes a highly desirable material for coatings over latex.

*Example 13*

| | Grams |
|---|---|
| Chlorinated rubber—25 C. P. S. | 10 |
| Dibutyl phthalate | 5 |
| Benzol | 49 |
| Trigamine Stearate | 3 |
| Water | 210 |

*Example 14*

| | Grams |
|---|---|
| Chlorinated rubber | 4.125 |
| Benzol | 45.870 |
| Morpholine | 1.500 |
| Oleic acid | 2.000 |
| Water | 50.000 |

This example, being unplasticized by dibutyl phthalate, produces a harder film than No. 13.

*Example 15*

| | Grams |
|---|---|
| Chlorinated rubber | 5.0 |
| Morpholine | 9.2 |
| Oleic acid | 5.0 |
| Water | 250.0 |

This emulsion is less stable than Examples 13 or 14, but is useful where alkaline reaction and absence of volatile is desirable.

*Example 16*

| | Grams |
|---|---|
| Chlorinated rubber | 5.0 |
| Benzol | 50.0 |
| Dibutyl phthalate | 2.0 |
| Oleic acid | 9.7 |
| Triethanolamine | 5.1 |
| Water | 170.0 |

In this example triethanolamine and oleic acid are used as an emulsifier, and dibutyl phthalate as a plasticizer.

*Example 17*

| | Grams |
|---|---|
| Chlorinated rubber | 5.0 |
| Benzol | 50.0 |
| Oleic acid | 9.7 |
| Triethanolamine | 5.1 |
| Water | 170.0 |

This emulsion tends to produce a very brittle film.

*Example 18*

To Example 17 may be added:

| | Grams |
|---|---|
| Casein | 10 |
| Morpholine | 10 |
| Water | 80 |

When these are combined with Example 17 the resulting film dries somewhat faster.

The synthetic resins constitute an ever growing list of materials useful in the arts and sciences, and of particular use in the surface coating industry. It is not the purpose of this invention to cover every available synthetic resin, but rather to show by a representative cross section that these materials, when properly emulsified, are satisfactory.

*Example 19*

| | Per cent |
|---|---|
| Polymerized methyl methacrylate | 13.12 |
| Polymerized butyl methacrylate | 13.12 |
| Dammar resin | 8.00 |
| Dibutyl phthalate | 5.77 |
| Benzoyl peroxide | 0.22 |
| Duponal ME (wetting agent) | 2.39 |
| Water (by difference) | 57.38 |

The benzoyl peroxide in the above composition is used as a polymerization catalyst in the manufacture of the emulsion. It is converted entirely into benzoic acid during the manufacturing reaction.

Good results have also been obtained by substituting Dupont "Alkanol B" for "Duponal ME," and adding two percent paraffin. "Duponal ME" is the sodium salt of sulfated straight chain primary alcohols containing 8–14 carbon atoms, while "Alkanol B" is the sodium sulfonate of isopropylated naphthalene.

In normal use, one gallon of either of the above synthetic resin emulsions is sufficient to treat one carload of 176 size oranges, which amounts to about 70,000 oranges. Presumably, even less emulsion would be used on apples because of the smoother skin.

*Example 20*

| | Grams |
|---|---|
| Alkyd resin | 26.4 |
| Morpholine | 3.0 |
| Water | 250.0 |

This example is of an alkyd resin solution of the oxydizing type cut in mineral spirits to a concentration of 60 percent solids.

*Example 21*

| | Grams |
|---|---|
| Alkyd resin | 50 |
| Dibutyl phthalate | 4 |
| Oleic acid | 4 |
| Triethanolamine | 2 |
| Carbon tetrachloride | 50 |
| Zinc naphthenate 8% | 1 |
| Water | 200 |

This is a rosin modified alkyd emulsion with dibutyl phthalate as a plasticizing agent which gives a very pliable film.

Example 22

| | Grams |
|---|---|
| Alkyd resin | 50 |
| Oleic acid | 20 |
| Morpholine | 18.3 |
| Water | 515.0 |

The resin in this example is the same as in the preceding example. The absence of dibutyl phthalate and the substitution of morpholine for the triethanolamine produce a film that is slightly harder and more lustrous.

Example 23

| | Grams |
|---|---|
| Modified alkyd resin | 50 |
| Oleic acid | 20 |
| Morpholine | 18.3 |
| Water | 500.0 |

An example of further modification of an alkyd resin with a fatty acid.

Example 24

| | Grams |
|---|---|
| Modified phenolic resin | 25 |
| Oleic acid | 20 |
| Triethanolamine | 4.2 |
| Mineral spirits | 15.0 |
| Water | 500.0 |

The resin here used is an extremely hard variety of a modified phenolic type further modified by using an excess of oleic acid in the emulsion.

Example 25

| | Grams |
|---|---|
| Coumarone indene resin | 50 |
| Oleic acid | 20 |
| Triethanolamine | 4.2 |
| Mineral spirits | 15.0 |
| Water | 500.0 |

A high melting point resin producing a film of high luster and good adhesion to latex.

Example 26

| | Grams |
|---|---|
| Melamine resin | 50 |
| Oleic acid | 26.2 |
| Triethanolamine | 13.8 |
| Water | 500.0 |

A resin representative of the urea formaldehyde class. Films formed from emulsions of this type are very pliable and remain somewhat softer than other classes of resins.

Aqueous emulsions of the drying oils such as linseed, hempseed, perilla, China-wood and walnut oils possess distinct film forming properties which prove of value in the coating of unvulcanized latex. Emulsions made according to the following examples, while relatively slow drying, are adherent, tough and lustrous.

Example 27

| | Grams |
|---|---|
| Drying oil | 100.0 |
| Lead naphthenate as metal | .160 |
| Manganese naphthenate as metal | .084 |
| Cobalt naphthenate as metal | .084 |
| Triethanolamine | 17.300 |
| Oleic acid | 32.700 |
| Water | 1200.000 |

Cellulose esters may be emulsified in aqueous phase by proper technique, and when so formed are stable for long periods of time. Emulsions so formed are not subject to the fire hazards of the usual cellulose lacquers. Cellulose acetobutyrate and ethyl cellulose are representative types of cellulose esters and as such are used as examples.

Example 28

| | Grams |
|---|---|
| Ethyl cellulose | 10 |
| Diethylene chloride | 100 |
| Triethanolamine | 2 |
| Oleic acid | 15 |
| Water | 150 |

Example 29

| | Grams |
|---|---|
| Ethyl cellulose | 5.0 |
| Ethanol | 37.4 |
| Oleic acid | 5.0 |
| Morpholine | 1.2 |
| Water | 50.28 |

In this example ethanol and morpholine have been substituted for diethylene chloride and triethanolamine, respectively. These emulsions are made in the conventional manner by passing through a colloid mill several times or by rapid agitation.

Example 30

| | Grams |
|---|---|
| Cellulose acetobutyrate | 6.35 |
| Ethylene dichloride | 43.00 |
| Triethanolamine | 1.59 |
| Oleic acid | 3.17 |
| Dibutyl phthalate | 1.27 |
| Water | 44.60 |

If a more waterproof film is desirable, morpholine is substituted in place of triethanolamine. In many cases it is also desirable to produce a harder as well as more waterproof film, in which case satisfactory results may be obtained by the following example.

Example 31

| | Grams |
|---|---|
| Cellulose acetobutyrate | 4.32 |
| Ethylene dichloride | 44.10 |
| Morpholine | 1.00 |
| Oleic acid | 3.25 |
| Water | 47.33 |

The use of mazein, a protein product derived from corn, when emulsified in aqueous phase in essentially the following proportions, produces an ideal coating material for removing the tackiness and producing a highly lustrous film on latex dipped articles.

Example 32

| | Grams |
|---|---|
| Mazein | 10 |
| Ethyl alcohol | 20.6 |
| Oleic acid | 6.5 |
| Triethanolamine | 3.5 |
| Water | 120.0 |

The following are examples of solutions and dispersions which have been found suitable for the second coating over latex dipped articles:

Example 33

| | Grams |
|---|---|
| Methyl cellulose | 5 |
| Water | 300 |

Dissolve methyl cellulose in small amount of water. When completely dissolved, add balance of water. This solution produces a clear glossy film over latex.

Example 34

| | Grams |
|---|---|
| Corn starch | 1.0 |
| Sodium hydroxide | .125 |
| Water | 64.0 |

Add sodium hydrate to 54 grams of water and heat to boiling. To balance of water add corn starch and mix. Add this mixture to the boiling sodium hydrate and water solution, with constant stirring. The desired film thickness may be regulated by using more or less water, as the occasion demands.

Example 35

| | Grams |
|---|---|
| Casein | 10 |
| Borax | 5 |
| Morpholine | 2 |
| Water | 100 |

Add ingredients in order given and heat over a water bath at 180° F. until completely dispersed. Add additional water to make up to original weight after removing from heat. Film thickness may be varied to the desired point by using more or less water.

Example 36

| | Grams |
|---|---|
| Manila gum DBB | 8 |
| Ethanol | 92 |

The manila gum is cut in the ethanol and is ready for use after filtering to remove insoluble impurities. Such gums and resins as dammar, shellac, kauri, pontianak or East India may be substituted for manila with like results.

Example 37

| | Grams |
|---|---|
| Chlorinated rubber—5 C. P. S. | 10 |
| Ethylene dichloride | 90 |
| Ethanol | 20 |

Dissolve the chlorinated rubber in the ethylene dichloride and to the resulting mixture add the ethanol.

Example 38

| | Grams |
|---|---|
| Mazein | 10 |
| Ethyl alcohol | 50 |
| Water | 3 |

To the finely powdered mazein add the ethyl alcohol and stir until dissolved. This produces a turbid solution. Upon the addition of the water complete solution results.

Example 39

| | Grams |
|---|---|
| Casein solution | 90 |
| Magnesium carbonate | 2 |
| Water | 8 |

To the solution of casein made as in Example 35, add 2 grams of magnesium carbonate dissolved in 8 grams of water.

Example 40

| | Grams |
|---|---|
| Ethyl cellulose | 10 |
| Ethylene dichloride | 30 |
| Ethyl alcohol | 60 |

Dissolve the ethyl cellulose in the ethylene dichloride and add the ethyl alcohol.

Example 41

| | Grams |
|---|---|
| Sodium silicate (1:325) | 10 |
| Water | 80 |
| Hydrochloric acid, 10% sol | 10 |
| Aresol O. T., 10% sol | 5 |

Combine in the order given.

Example 42

| | Grams |
|---|---|
| Cellulose acetobutyrate | 10 |
| Ethylene dichloride | 90 |

Dissolve the cellulose acetobutyrate in the ethylene dichloride. Dibutyl phthalate may be used as a plasticizer if desired.

The essential attributes of the outer gloss imparting film are: (a) that it may be applied to the fruit or other article by brushing it onto the article, or by dipping the article into the liquid material, or by spraying or showering the material thereover, followed by draining the excess material therefrom and drying the so deposited film; (b) that the resultant coating be inherently lustrous so that it is unnecessary to subject the coated object to brushing or other polishing treatment; (c) that the surface tension of the coating liquid be such as to completely wet the surface of the underneath coating without leaving uncoated areas; (d) that the outer film of the gloss imparting agent be firmly adherent to the underneath coating, such as latex; and (e) that it consist of such ingredients that the resultant outer film will not form a completely impervious seal over the underneath coating.

Particular emphasis has been placed upon the suitability of the herein described coatings, and process of forming such coatings, as applied to fruits and vegetables, because of the special problems of transpiration and cleanliness appertaining thereto. As previously indicated, however, the present invention is obviously not so limited in its applicability, and, in fact, is of equal utility with a wide variety of other articles. As a further example, the protective coating of the invention may be advantageously applied to meats, since by actual tests it has been found that the keeping qualities of meats has been materially improved when covered with coatings as described. The color, flavor and texture of the meat of coated fowl was observed to be considerably better, as compared with uncoated fowl, the coated and uncoated test specimens having been kept under otherwise identical conditions. It was also found that the coating did not interfere with the normal ageing processes desirable for freshly killed meats, while the natural juices were retained, as compared with the excessive dehydration of uncoated meats through storage in a refrigerated atmosphere. As in the case of fruits, previously discussed, due to the transparency of the film, the meat may be visually inspected by the prospective buyer in the making of a selection. Furthermore, since the film is elastic and durable, the meat may be handled without resulting in the puncturing of the film and, hence, without danger of contamination of the meat.

Cheeses coated in the manner described in connection with fruit were found to age in a superior manner without excessive loss of moisture. Since cheeses experience a certain transpiration phenomenon, the coating of this invention was found entirely satisfactory as a protective covering therefor. With cheeses, as well as with many other articles having a characteristic odor, such as tobacco, scented soaps, and the like, it is desirable, from the point of view of the merchandiser, that the aroma of the enclosed article or goods be permitted to permeate through the protective covering for the benefit of the customer. Such penetration of odors and scents can take place freely through the coatings as herein described.

In general, the coatings may be applied directly to the surface of the articles, that is, in such cases where the surface of the article is more or less firm and substantially imperforate or smoothly continuous over the whole. In the case of other articles, which have no constant or definite surface or which are more or less porous, or even granular in nature, it may be desirable to first provide a wrapping of a suitable material, such as paper, thereabout, before the successive coatings herein disclosed are applied. Granular and pulverulent materials may be provided in a carton, or other suitable container, to which the successive coatings may be applied to form a protective coating thereabout to preserve the contents in a fresh condition, or otherwise to enhance the marketable condition thereof.

The characteristic property of latex which facilitates the transpiration of coated fruits, vegetables, meats, cheeses and like products therethrough, or the permeation of odors and scents, has been referred to as being due to the minute surface porosities extending through the film. It is entirely possible that the correct explanation of this characteristic may be somewhat more involved. It has been suggested that the filtration of gases from fruit, or odor from scented soaps and the like, occurs, not by virtue of actual openings through the latex film, but by a process of absorption whereby the gases emanating from the enclosed product are temporarily absorbed into the latex, and then subsequently set free into the ambient atmosphere. It has also been suggested that the observed phenomenon is facilitated by the molecular movement within the latex, permitting gaseous molecules a restricted freedom of passage therethrough. Thus, while the latex may not be porous in a strict sense, for convenience in the absence of a better term, this physical characteristic of the latex, resembling that of an ordinary porous membrane, will be simply referred to as the porosity of the film. The characteristic is also true of the outer gloss imparting film, and for similar reasons the same expression will also be used for the designation of this particular characteristic thereof.

Another important feature of the invention is the provision of the tab which is fastened to the removable covering. The tab may be applied either before or after applying the first coating, and provides a means whereby the covering may be removed from the article. Preferably, the tab is formed by a portion of a fabric tape which, in its practical application, if of sufficient length and width to be used for designating the brand name of the article to which it is attached. The tape is placed upon the article by grasping one end of the tape and drawing it through a bath of coating material so that the underside of the tape is coated with the solution. Thereupon the tape is placed upon the article, the coating on the underside of the tape causing it to adhere thereto, after which the latex coating may be applied to the article. When the latex coating has dried, it will be discovered that the end of the tape which was grasped by the operator when the tape was placed upon the article has curled away from the article so that it projects through the latex coating subsequently applied to the article. Thereafter, the projecting end of the tape may be gently pressed against the latex coating therebeneath, and thus caused to lie flatly against the surface of the product.

Since the fabric tape extends underneath the covering in such manner as to engage the surface of the article, and projects through the covering into the atmosphere, there is provided thereby an additional means for the exudation of carbon dioxide from beneath the covering.

The covering may readily be removed from the article by pulling the protruding end of the tape and peeling the covering from the article therewith. In the drawing which forms a part of this application, there is illustrated the manner of removing the covering from the article, wherein the reference numeral 1 denotes an article, for example, an apple to which has been applied a protective covering 2 consisting of successively applied coatings of latex or the like substance and a coating material compounded according to one of the formulas hereinbefore set forth, there being embedded in the covering a length of tape 3 of which one end thereof forms a tab 4 by which the covering may be peeled from the surface of the apple.

By reason of the practical application of the hereinbefore described process, prime, juicy fruit may be wrapped in a removable covering that emphasizes the natural beauty of the fruit. This is effected, as has been pointed out, by successively applying to the fruit materials in a liquid phase which, upon drying, form a skin-like, removable, transparent covering. This covering stands constantly as a badge of cleanliness. When the covering is removed, the fruit may be eaten, skin and all, it being a well known fact that the mineral content of the fruit, which is so valuable as an asset to the physical well being of the human family is carried in and immediately under the skin of the fruit.

Having now described my invention and in what manner the same may be used, what I claim as new and desire to protect by Letters Patent is:

1. The process of protectively coating comestible products having a relatively firm and continuous surface, which consists of providing such products with a readily removable nonadherent continuous film-like transparent envelope closely conforming to the surface of each of said products by applying thereto a concentrated colloidal solution of rubber particles dispersed in an aqueous medium, and thereafter providing each of said products with a gloss imparting coating by applying thereto an emulsified liquid coating substance including therein a hard-drying material selected from the group of natural resins, oleo resins and ester gums, comprising manila, kauri, East India, pontianak, sandrac, dammar, clemi Congo, batik, and gum rosin, said material forming a continuous outer film-like envelope of extremely minute thickness firmly adhering to said first applied envelope without completely sealing the minute surface porosities of said first envelope.

2. The process of protectively coating comestible products having a relatively firm and continuous surface, which consists of providing such articles with a readily removable nonadherent continuous film-like transparent envelope closely conforming to the surface of such articles by applying thereto latex in concentrated solution, and thereafter providing said articles with a gloss imparting coating which consists in applying an aqueous emulsion of a wax from the group comprising beeswax, paraffin, ceresin, montan wax, carnauba, and candelilla.

3. The process of protectively coating comestible products having a relatively firm and continuous surface, which consists of providing such articles with a readily removable nonadherent continuous film-like transparent envelope closely conforming to the surface thereof by applying thereto latex in concentrated colloidal solution, and thereafter providing said articles with a gloss imparting coating which consists in applying an emulsified solution of synthetic resin over said first applied envelope, said resin being selected from the group comprising cumar, alkyd, phenolic, acrylate and urea synthetic resins.

4. The process of forming a protective transparent envelope on a unitary article of commerce having a relatively firm and substantially smooth surface comprising coating said article with a concentrated solution of latex, drying said coating so as to form a film about said article, adding a second coating consisting of an emulsified solution of synthetic resin selected from the group comprising cumar, alkyd, phenolic, acrylate and urea synthetic resins, and drying said second coating.

5. The process of coating a unitary article of commerce having a substantially imperforate surface, comprising applying a first coat of latex to form a continuous, thin, transparent film on the surface of each said article, subsequently applying a liquid coating substance including therein a hard drying material over said first coat, said material being selected from the group comprising beeswax, mineral waxes, vegetable waxes, natural resins, and alkyd, cumar, phenolic, acrylate, and urea synthetic resins and chlorinated rubber, casein, cellulose esters, mazein and cornstarch, and drying said liquid coating to form a hardened, glossy surface on said latex.

6. The process of protectively coating unitary food products having a relatively firm and continuous surface which consists of applying to each said product a first coating of a concentrated colloidal solution of rubber particles dispersed in an aqueous medium for forming a readily removable non-adherent continuous film-like transparent envelope over said product, drying said first coating, and thereafter applying thereto an aqueous emulsion of a hard drying material for forming a hard lustrous transparent outer coating firmly adherent to said first coating and having properties permitting transpiration of said product through said coatings.

7. The process of protectively coating unitary food products having a relatively firm and continuous surface which consists of applying to each said product a first transparent coating of a concentrated colloidal solution of latex dispersed in an aqueous medium, drying said first coating, and then applying thereto a solution of a hard drying material for forming a hard, lustrous, transparent outer coating of minute thickness intimately superimposed over said first coating and having properties of permitting transpiration of said product through said coatings.

8. The process of protectively coating fruits and vegetables having a relatively firm and continuous surface, which consists of providing such products with a readily removable nonadherent continuous film-like transparent envelope closely conforming to the surface of each of said products by applying thereto a concentrated colloidal solution of rubber particles dispersed in an aqueous medium, thereafter providing each of said products with a gloss imparting coating by applying thereto an emulsified liquid coating substance including a hard drying material forming a continuous outer film-like envelope of extremely minute thickness firmly adhering to said first applied envelope and having properties permitting transpiration of said product through said coatings, and providing a fabric tape extending under said envelope and projecting through said envelope into the atmosphere and providing an additional means for the exudation of carbon dioxide from beneath the envelope, said tape having thereon distinguishing marks for indicating the source of said product, said label being clearly visible through said coatings.

9. The process of forming a protective transparent envelope on a unitary article of commerce having a relatively firm and continuous surface, which consists of providing such articles with a readily removable nonadherent continuous film-like transparent envelope closely conforming to the surface of such articles by applying thereto latex in concentrated solution, and thereafter providing said articles with a gloss imparting coating which consists of applying an aqueous emulsion of chlorinated rubber over said first applied envelope.

LORENZ M. REDLINGER.